Feb. 28, 1967 K. W. COWANS 3,306,075

THERMAL COUPLING STRUCTURE FOR CRYOGENIC REFRIGERATION

Filed Oct. 4, 1965 2 Sheets-Sheet 1

INVENTOR.
KENNETH W. COWANS,
BY Neil J. Driscoll
ATTORNEY.

Feb. 28, 1967 K. W. COWANS 3,306,075

THERMAL COUPLING STRUCTURE FOR CRYOGENIC REFRIGERATION

Filed Oct. 4, 1965 2 Sheets-Sheet 2

INVENTOR.
KENNETH W. COWANS,
BY
Neil J. Driscoll
ATTORNEY.

United States Patent Office 3,306,075

Patented Feb. 28, 1967

3,306,075
THERMAL COUPLING STRUCTURE FOR CRYOGENIC REFRIGERATION

Kenneth W. Cowans, Los Angeles, Calif., assignor to Hughes Aircraft Company, Culver City, Calif., a corporation of Delaware Filed Oct. 4, 1965, Ser. No. 492,801
11 Claims. (Cl. 62—514)

The invention relates to cryogenic device refrigeration and particularly to thermal coupling arrangement providing heat load temperature control at varying temperature levels.

In operating infrared detectors and similar devices at normal ambient temperatures, electron excitation occurs which provides a source of electrical noise that has the effect of minimizing the detectable signal. To improve the performance of detectors, means have been provided to cool the detector material and thereby reduce such thermal excitation. Cooling of the detectors, therefore, reduces detector noise output and increases detection sensitivity.

Refrigerators have been developed which have the capacity to cool infrared detectors to extremely low cryogenic temperatures. The refrigerator devices developed employ many well known principles of operation such as the Joule-Thomson effect, the Claude cycle, or the Stirling cycle. As a general proposition, refrigerating to cryogenic temperatures, that is, temperatures below 100° K., has become practical as equipment has been developed to liquefy certain gases such as oxygen, nitrogen and helium with a degree of efficiency. Such refrigerating devices are generally designed to operate at a specific temperature level. For example, a Stirling refrigerator, of recent development, has been designed to provide refrigeration in the 25° K. range.

In certain service applications, it may be desirable to alternately provide cryogenic refrigeration at different temperature levels. Heretofore, a service application of this nature required the substitution of a different refrigerator device as the heat load temperature level was varied.

It is a general feature of the disclosed invention to provide selectively usable thermal coupling arrangements adapted for selective association with a specific refrigerator whereby alternate heat loads may be cooled to different temperature levels. For example, a refrigerator having a 25° K. capacity may be used to cool a first heat load to that temperature and alternately provide a refrigerating or cooling effect to a heat load having an operating temperature range at a significantly higher temperature level, for example, 77° K.

The detectors that provide the heat load to be cooled are usually positioned in Dewar type containers which isolate the detector from ambient temperature condition by providing a surrounding vacuum. In order to accomplish heat transfer in a vacuum to cool the load, it is necessary that surfaces directly contact each other so that heat may be transferred via conduction therebetween. It is known that the quantity of heat transferred between contacting surfaces of a given area per unit of time is directly related to the pressure or force which holds the surfaces in direct contact. As the pressure is increased, thermal loss at the contacting interface is decreased. Additional problems are presented in view of the fact that the extreme temperature encountered results in variable expansion and contraction of the thermal coupling structure. Accordingly, the coupling means must accommodate variation in coupling expansion and contraction and yet maintain appropriate pressure contact at the interfaces. Thus heat may be efficiently transferred between surfaces having relatively minor temperature differentials irrespective of the vacuum condition in the Dewar assembly.

With the above in mind, the present invention incorporates a conventional refrigerating unit having an elongated cold element or finger which may be positioned within a detector housing Dewar, said finger incorporating a unique compliant heat transfer surface to provide direct contact with the inner Dewar walls at desired pressure levels to thus assure efficient heat transfer therebetween.

Specifically, the finger incorporates an annular surface having metallic, cantilevered leaves affixed thereto and flexibly expanded by free floating resilient means, such as a spring, whereby the leaves are biased outwardly for firm pressured engagement with the surrounding Dewar walls. The structure additionally accommodates relative movement between the finger and the Dewar wall structure which may occur during operation as a result of extreme temperature variation.

The invention further includes selectively substitutable Dewar assemblies which result in the cooling of alternate heat loads at differing temperature levels Specifically, the arrangement utilizes a refrigerator having design capacity to cool a load to a first temperature level, e.g., 25° K., by employing a first Dewar configuration. When it is desired to utilize the same refrigerator to cool a heat load at a substantially higher temperature level, for example, 77° K., an alternate Dewar configuration is substituted. The alternate configuration includes means to shunt a determined amount of the total capacity of the refrigerator to ambient. Thus a given refrigerator may be employed to cool alternate detectors at different temperature levels.

These and other features and advantages of the invention will become apparent in the course of the following description and from an examination of the related drawings, wherein.

Figure 1:
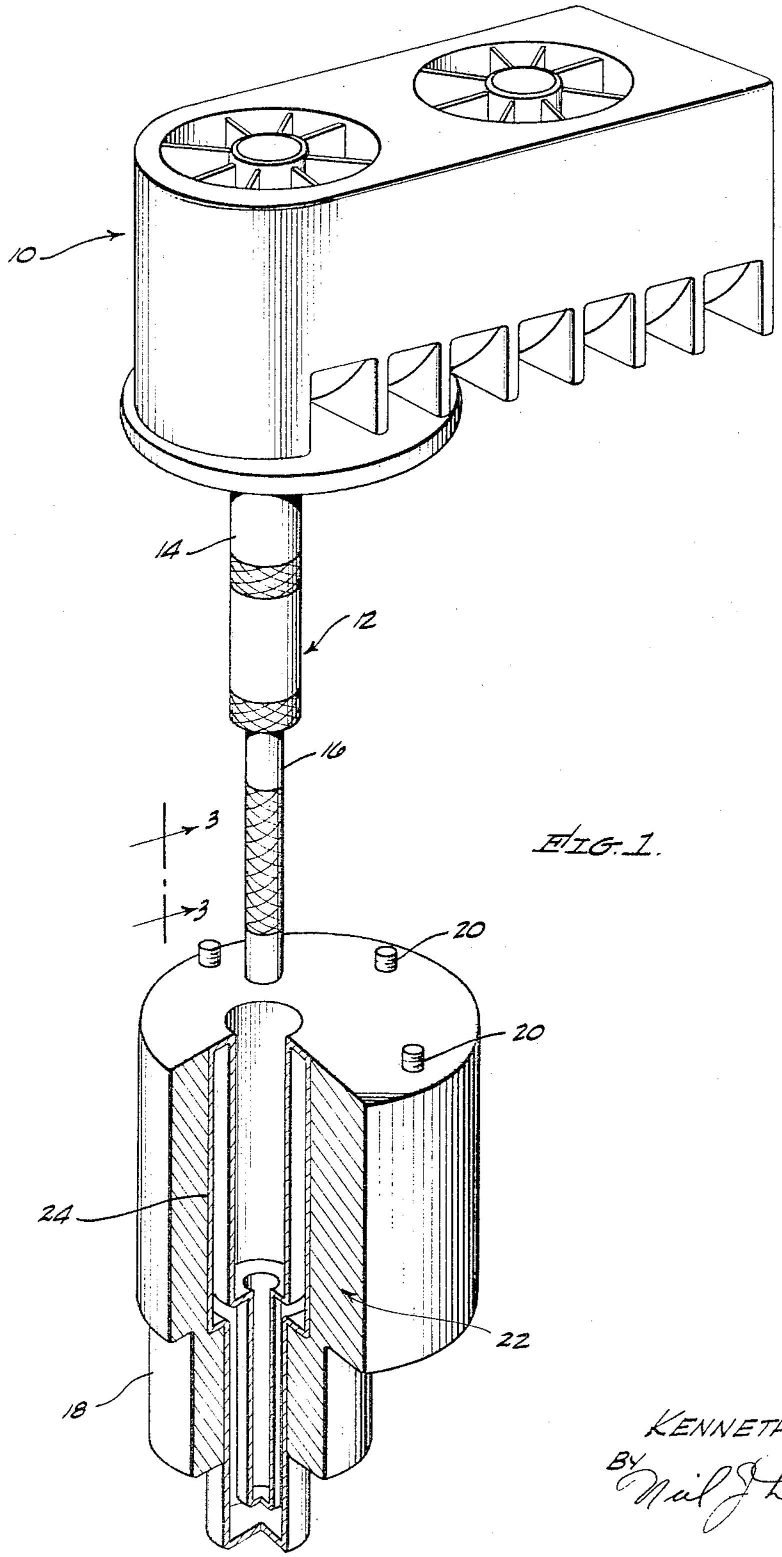
FIG. 1 is a composite, exploded perspective view of an arrangement employing the invention.

Describing the invention in detail and directing attention to FIG. 1, the numeral 10 generally indicates a cryogenic refrigerator which may be of any conventional type, for example, a Stirling cycle refrigerator. A cold finger 12 containing therein an expansion cylinder (not shown) may project from the refrigerator 10. The finger 12 is preferably constructed of a highly conductive material of high purity such as copper to facilitate thermal transfer. The finger 12 comprises an upper relatively large diameter segment 14 and a smaller diameter segment 16 projecting axially therebelow.

Figure 2:
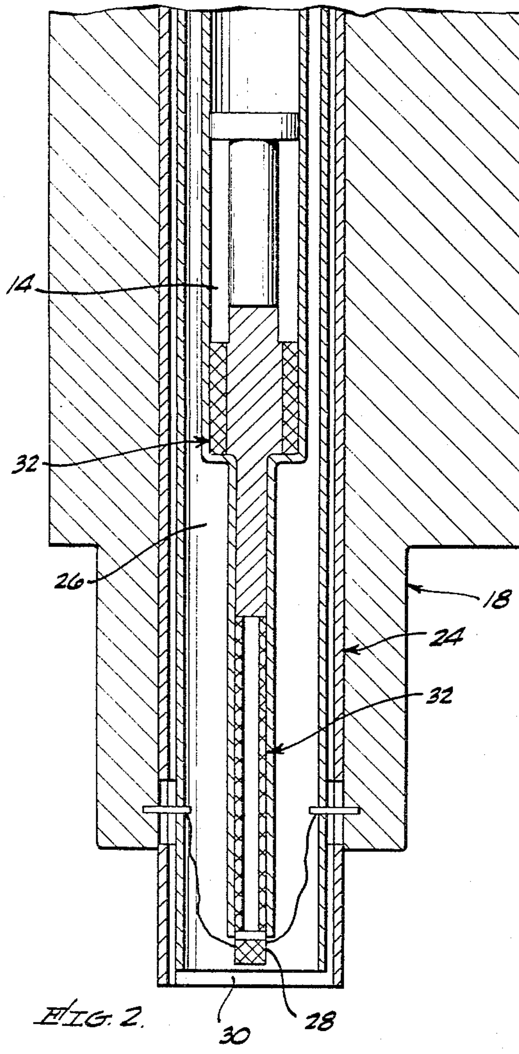
FIG. 2 is a vertical sectional view of the arrangement shown in FIG. 1 partly in elevation and illustrating a first thermal coupling structure.

Provision is made for fixedly mounting a first detector assembly, indicated generally at 18 to the refrigerator 10. Mounting studs 20, 20 are satisfactory for this purpose. The detector assembly 18 comprises an outer housing 22 of suitable insulating material containing therewithin a double walled glass Dewar indicated generally at 24. The Dewar 24 internally defines an evacuated vacuum space 26 which thermally isolates a mounting plate and detector assembly 28 from ambient. A viewing window 30 may be provided to accommodate energy impingement on detector assembly 28. The segments 14 and 16 of the cold finger 12 are provided with upper and lower compliant heat transfer surfaces 32, 32 of identical cinstruction. The surfaces 32 are shown schematically in FIGS. 1 and 2.

Figure 3:
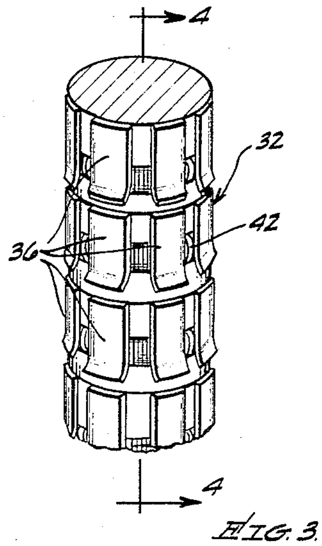
FIG. 3 is a fragmentary sectional view taken along line 3—3 of FIG. 1.
Figure 4:
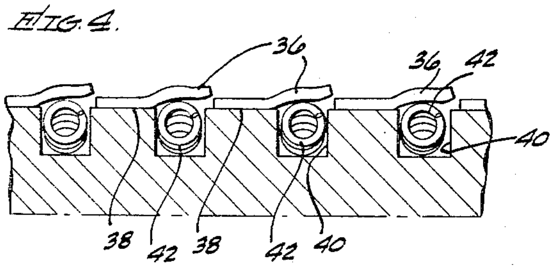
FIG. 4 is a sectional view taken along line 4—4 of FIG. 3.

Specifically directing attention to FIGS. 3 and 4, it will be seen that the surfaces 32 comprise a plurality of longitudinal elongated and peripherally arrange metallic leaves 36, 36 annularly secured, in cantilever fashion, to the surface of the finger 12. The leaves 36 are preferably made of a material such as copper having a high thermal conductivity and are conventionally connected, as for example, by soldering at 38, 38, to the finger 12. Adjacent the free end of each copper leaf an annular slot 40 is provided, each slot having disposed therein a resilient element, such as free floating springs 42, 42, which pressure bias the adjacent copper leaves outwardly. Thus, in the assembled structure of FIG. 2, the compliant heat transfer surface pressure engages the adjacent inner surface of the Dewar wall. A high degree of thermal conductivity per unit area is provided even though a vacuum condition may exist in the detector assembly while the refrigerator is cold. Additionally, a degree of flexibility is introduced to the structure by virtue of the construction of the compliant heat transfer surface 32 just described. That is, relative movement of the Dewar wall relative to the cold finger 12, as a result of a variation in the coefficient of expansion therebetween or other causes, is effectively accommodated by the structure of the compliant heat transfer surface.

Figure 5:
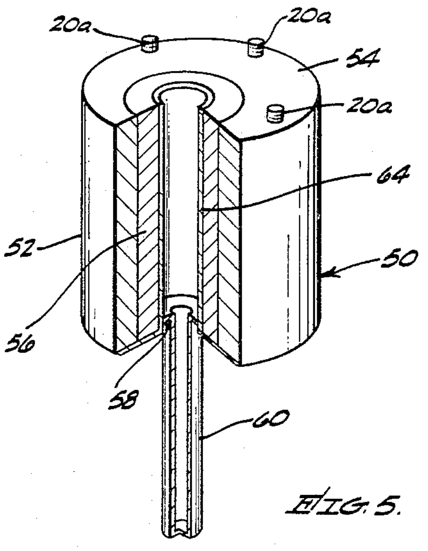
FIG. 5 is a partially sectional perspective view of an alternate detector assembly that may be utilized with the invention.

As earlier noted, certain service applications require that the refrigerating device be utilized to cool a heat load at a temperature level other than the design capacity temperature level of the specific refrigerator. To efficiently meet this service requirement, the invention employs an interchangeable Dewar container indicated generally at 50 in FIG. 5. The purpose of the container 50 is to provide a unit having a higher degree of thermal conductivity per unit of time. Specifically, the container 50 comprises a housing 52 having a mounting plate 54 adapted for attachment to the refrigerator 10, via studs **20*a* as in the previous embodiment. Internally of the housing 52, an annular layer of permeable insulation 56 is provided. At the lower aspect of the housing 52 a plastic compensating block 58 is carried, the block having mounted thereon an extended metallic tube 60 forming part of the container 50. A detector arrangement may be carried in the lower aspect of tube 60**. As cryogenic temperatures are reached, the tube shrinks longitudinally. The plastic block, which may be nylon, also shrinks or contracts but to a greater degree than the tube. Thus the shrinkage of the metallic tube is compensated for.

Internally of the permeable insulation 56, a metallic thermal shorting tube 64 is provided which is in direct engagement with the refrigerator 10. When the container 50 is assembled to the cold finger 12 of the refrigerator 10, it will be apparent that the upper compliant heat transfer surface 32 will be in direct pressured engagement with the thermal shorting tube 64. Additionally, the compliant heat transfer 32 on the lower aspect **16*a* of the cold finger 12 will be in direct pressured engagement with the inner surface of the tube 60. The effect of the permeable insulation 56 alone or in combination with the thermal shorting tube 64** is to shunt some of the available refrigeration to ambient whereby the detector assembly heat load will be maintained at a temperature level above the maximum design temperature level of the particular refrigerator. In effect, some of the refrigerating capacity is wasted. This seeming inefficiency, however, is more than compensated for by the fact that a single refrigerator is able to perform a multiple function, that is, utilized for different operating temperature levels.

As noted above, efficient thermal transfer in a vacuum condition, such as exists in the Dewar containers herein disclosed, requires direct physical contact between conductive elements of the structure. It will also be understood that where it is desirable to selectively operate alternate Dewar containers having different heat loads and therefore requiring different cryogenic temperature levels, the expansion and contraction characteristics of the alternate structures will be different in view of the substantial difference in cryogenic temperature levels, for example, the difference between 25° K. and 77° K. in the above noted examples. When it is considered that a single refrigerator employing a single cold finger is to be adapted to different Dewar containers, it will be appreciated that with a conventional Dewar cold finger, it is extremely difficult to maintain the proper surface contact between the finger and the alternate containers at the different temperature levels. In order, therefore, for the refrigerator to efficiently handle the heat load requirement of each container, it is necessary to employ structure which can accommodate variation in physical size and yet maintain pressure contact at the thermal interfaces so that appropriate thermal conductivity is maintained. The complaint heat transfer surfaces above described efficiently fulfill this service requirement. The coupling arrangement thus described not only provides for efficient, in vacuum, thermal transfer in the cryogenic range, but offers the service flexibility of maintaining alternate heat loads at different cryogenic temperature levels.

The invention is shown by way of illustration and in limitation and may be modified in many particulars, all within the scope of the appended claims.

What is claimed is:

1. In a coupling arrangement providing thermal transfer between a container for and a cryogenic refrigerator,
- a cold finger associated with the refrigerator and having an annular surface thereon,
- said container having a surface defining a central cavity to telescopically receive the cold finger,
- and flexible thermally conductive means on one of the surfaces adapted for flexible pressure engagement with the other surface to provide a thermal transfer path between the surfaces,
- said flexible means being in area engagement with the respective surfaces to provide efficient thermal transfer paths therebetween.

2. A cooling arrangement providing thermal transfer between a container for and a cryogenic refrigerator according to claim 1,
- wherein said flexible means comprises a plurality of metallic leaves cantilever-mounted on the surface of said cold finger,
- resilient means carried by the cold finger to flexibly bias the leaves outwardly of the surface of the cold finger,
- said leaves thereby pressure engaging the surface of said container cavity.

3. A coupling arrangement to provide thermal transfer between a container for and a cryogenic refrigerator according to claim 2,
- wherein said resilient means comprises a plurality of annular free-floating springs.

4. In a coupling arrangement providing thermal transfer between a Dewar container and the cold finger of a cryogenic refrigerator,
- the combination of a plurality of spaced walls in the container defining a vacuum space therebetween,
- the inner of said walls defining a central container cavity,
- said cold finger being adapted for disposition within the cavity,
- flexible means on the surface of the finger adapted to engage the cavity defining Dewar wall and operative to provide thermal transfer between the wall and the surface, and
- pressure means to resiliently bias said flexible means into said engagement.

5. A coupling arrangement to provide thermal transfer between a Dewar container and a cryogenic refrigerator cold finger according to claim 4, wherein said flexible means comprise a plurality of cantilever-mounted metallic leaves, and wherein said pressure means comprises resilient means carried by the finger to bias the leaves flexibly outwardly of the finger.

6. In a coupling arrangement to provide thermal transfer between a Dewar container and a cryogenic refrigerator cold finger, the combination of a Dewar container having a surface defining a central cavity adapted to telescopically receive said cold finger, flexible means on the finger surface adapted for outward engagement with the cavity-defining Dewar wall to provide thermal transfer between the surface and the wall, and pressure means to induce outward biasing of said flexible means and thereby maintain said engagement, and insulating means surrounding the cavity defining Dewar wall and adapted to shunt a portion of the refrigerating effect of the cold finger to atmosphere.

7. A coupling arrangement to provide thermal transfer between a Dewar container and a cryogenic refrigerator cold finger according to claim 6, wherein said flexible means comprise a plurality of metallic leaves cantilever-mounted on the surface of the cold finger, and said pressure means comprising resilient means carried by the cold finger to flexibly bias the leaves outwardly of the surface of the finger.

8. In a cold finger arrangement for a cryogenic refrigerator, flexible thermally conductive means carried by the surface of the cold finger to provide a thermal transfer path from said surface, and resilient means carried by the finger to flexibly bias the flexible means outwardly of the surface of the cold finger.

9. A cold finger arrangement for a cryogenic refrigerator according to claim 8, wherein said flexible means comprise a plurality of metallic leaves carried by the surface of the cold finger, said resilient means biasing segments of the metallic leaves outwardly of the surface of the cold finger.

10. A cold finger arrangement for a cryogenic refrigerator according to claim 9, wherein said metallic leaves are cantilever-mounted on the surface of the cold finger, said resilient means comprising a plurality of free-floating springs carried by the cold finger.

11. A cold finger arrangement for a cryogenic refrigerator according to claim 10, wherein said springs are coiled springs and are carried by the cold finger in annular slots formed in the surface of the cold finger.

References Cited by the Examiner

UNITED STATES PATENTS

| | | | |
|---|---|---|---|
| 2,892,250 | 6/1959 | Bartels | 62—514 |
| 2,909,908 | 10/1959 | Pastuhov et al. | 62—514 |
| 2,939,938 | 6/1960 | Ravich | 62—514 |
| 2,951,944 | 9/1960 | Fong | 62—514 |
| 3,055,191 | 9/1962 | Dennis | 62—514 |
| 3,064,451 | 11/1962 | Skinner | 62—514 |
| 3,066,222 | 11/1962 | Poorman et al. | 62—514 X |
| 3,188,824 | 6/1965 | Geist et al. | 62—514 X |

FOREIGN PATENTS

| | | |
|---|---|---|
| 630,282 | 10/1961 | Canada. |

LLOYD L. KING, *Primary Examiner.*